US012775411B2

(12) United States Patent
Yen et al.

(10) Patent No.: US 12,775,411 B2
(45) Date of Patent: Oct. 27, 2026

(54) FLASH MEMORY CONTROLLER AND METHODS FOR EXECUTING CACHE ERASE OPERATION

(71) Applicant: Silicon Motion Inc., Jhubei City (TW)

(72) Inventors: Hsiao-chang Yen, Jhubei City (TW); Tsu-han Lu, Jhubei City (TW)

(73) Assignee: SILICON MOTION INC., Jhubei City (TW)

( * ) Notice: Subject to any disclaimer, the term of this patent is extended or adjusted under 35 U.S.C. 154(b) by 0 days.

(21) Appl. No.: 18/815,467

(22) Filed: Aug. 26, 2024

(65) Prior Publication Data

US 2025/0094073 A1 Mar. 20, 2025

(30) Foreign Application Priority Data

Sep. 14, 2023 (TW) ................................ 112135155

(51) Int. Cl.
*G06F 3/06* (2006.01)

(52) U.S. Cl.
CPC .......... *G06F 3/0652* (2013.01); *G06F 3/0604* (2013.01); *G06F 3/0659* (2013.01); *G06F 3/0679* (2013.01)

(58) Field of Classification Search
CPC .... G06F 3/0652; G06F 3/0604; G06F 3/0659; G06F 3/0679; G06F 3/061
See application file for complete search history.

(56) References Cited

U.S. PATENT DOCUMENTS

| | | | | |
|---|---|---|---|---|
| 6,748,482 | B1 | 6/2004 | Fackenthal | |
| 7,742,344 | B2 | 6/2010 | Roohparvar | |
| 10,942,677 | B2 | 3/2021 | Yang et al. | |
| 2007/0274134 | A1 | 11/2007 | Roohparvar | |
| 2011/0153914 | A1 | 6/2011 | Huffman et al. | |
| 2011/0161554 | A1* | 6/2011 | Selinger | G06F 13/1668 711/E12.001 |
| 2012/0167100 | A1* | 6/2012 | Li | G11C 16/22 710/5 |

(Continued)

FOREIGN PATENT DOCUMENTS

| | | | |
|---|---|---|---|
| CN | 101479806 | B | 10/2012 |
| CN | 104407997 | B | 9/2017 |
| CN | 108932961 | A | 12/2018 |

(Continued)

*Primary Examiner* — Francisco A Grullon

(57) ABSTRACT

A flash memory controller and a method for executing a cache erase operation are provided. The flash memory controller includes a first interface circuit and a processor. The first interface circuit is coupled to a flash memory to transmit data and commands. The processor is coupled to the first interface circuit to access the flash memory. The processor controls the first interface circuit to transmit a first command sequence and a second command sequence to the flash memory. The first command sequence includes a first command and a second command. In response to the transmission of the second command, the flash memory performs an erase operation. When the array ready status bit is in a non-ready status, the second command sequence is transmitted to the flash memory, so that related operations that will use a bus are performed while executing the erase operation to improve transmission efficiency.

19 Claims, 5 Drawing Sheets

(56) References Cited

U.S. PATENT DOCUMENTS

| | | | | |
|---|---|---|---|---|
| 2015/0248921 | A1 * | 9/2015 | Chen | G11C 5/04 711/103 |
| 2016/0259553 | A1 * | 9/2016 | Buxton | G06F 3/0688 |

FOREIGN PATENT DOCUMENTS

| | | | |
|---|---|---|---|
| CN | 114694722 | A | 7/2022 |
| CN | 116705113 | A | 9/2023 |
| TW | 201230039 | A | 7/2012 |
| TW | I735918 | B | 8/2021 |

* cited by examiner

FLASH MEMORY CONTROLLER AND METHODS FOR EXECUTING CACHE ERASE OPERATION

CROSS REFERENCE TO RELATED APPLICATIONS

This application claims priority to Taiwan Application Serial No. 112135155, filed Sep. 14, 2023, the entirety of which is hereby incorporated herein by reference.

FIELD OF DISCLOSURE

The present disclosure relates to a storage device, and in particular to a flash memory controller and a method for executing a cache erase operation.

BACKGROUND

A memory device includes a flash memory controller and a flash memory. The flash memory controller is configured to control operations of the memory device and access the flash memory, and the flash memory is configured to store data. When performing an erase operation, a bus between the flash memory controller and the flash memory is idle. In other words, no related operations that use the bus will be performed during this period, such as data transmission or command transmitting. This will cause the flash memory controller to stay in a waiting status before the erase operation is completed, resulting in an inability to fully utilize its computing power and resources, as well as a reduction in overall system performance and a waste of resources.

SUMMARY OF DISCLOSURE

In order to solve the above-mentioned problems of the prior art, an object of the present disclosure is to provide a flash memory controller and a method for executing a cache erase operation, which can perform related operations that use a bus while executing an erase operation to improve transmission efficiency.

In a first aspect, the present disclosure provides a flash memory controller for controlling a flash memory. The flash memory controller includes a first interface circuit and a processor. The first interface circuit is coupled to the flash memory to transmit data and commands. The processor is coupled to the first interface circuit to access the flash memory through the first interface circuit. The processor controls the first interface circuit to transmit a first command sequence and a second command sequence to the flash memory. The first command sequence includes a first command and a second command, the first command is configured to instruct the flash memory to receive address information, and in response to the transmission of the second command, the flash memory executes an erase operation corresponding to the address information, and when an array ready status bit is in a non-ready status, the second command sequence is transmitted to the flash memory.

In some embodiments, the flash memory is in the non-ready status when the array ready status bit of the flash memory is set to 0, and the flash memory is in a ready status when the array ready status bit of the flash memory is set to 1.

In some embodiments, in response to the transmission of the second command, a ready status bit of the flash memory and the array ready status bit are set to 0, and after a first busy period, the ready status bit is set to 1 and the array ready status bit is set to 0.

In some embodiments, the processor controls the first interface circuit to transmit a set feature command sequence to the flash memory before transmitting the first command sequence, the set feature command sequence is configured to enable the flash memory controller to transmit the second command sequence to the flash memory when the array ready status bit is in the non-ready status.

In some embodiments, the second command sequence includes the same commands as the first command sequence, and during a timing interval of the flash memory executing operations corresponding to the first command sequence and the second command sequence, the array ready status bit remains in the non-ready status.

In some embodiments, the second command sequence is configured to instruct the flash memory to execute a read operation, and during a timing interval of the flash memory executing operations corresponding to the first command sequence and the second command sequence, the array ready status bit remains in the non-ready status.

In some embodiments, the second command sequence is configured to instruct the flash memory to execute a write operation, and during a timing interval of the flash memory executing operations corresponding to the first command sequence and the second command sequence, the array ready status bit remains in the non-ready status.

In a second aspect, the present disclosure provides a method for executing a cache erase operation in a flash memory controller. The flash memory controller is coupled to a flash memory to transmit data and commands. The method includes a step of transmitting a first command sequence to the flash memory, where the first command sequence includes a first command and a second command, and the first command is configured to instruct the flash memory to receive address information; and executing, by the flash memory, an erase operation corresponding to the address information in response to the transmission of the second command, and transmitting a second command sequence to the flash memory when an array ready status bit is in a non-ready status.

In some embodiments, it indicates that the flash memory is in the non-ready status when the array ready status bit of the flash memory is set to 0, and it indicates that the flash memory is in a ready status when the array ready status bit of the flash memory is set to 1.

In some embodiments, before transmitting the first command sequence, the method further includes a step of transmitting a set feature command sequence to the flash memory. In response to the transmission of the set feature command sequence, the flash memory controller is capable of transmitting the second command sequence to the flash memory when the array ready status bit is in the non-ready status.

In some embodiments, the second command sequence includes the same commands as the first command sequence, and during a timing interval of the flash memory executing operations corresponding to the first command sequence and the second command sequence, the array ready status bit remains in the non-ready status.

In some embodiments, the second command sequence is configured to instruct the flash memory to execute a read operation, and during a timing interval of the flash memory executing operations corresponding to the first command sequence and the second command sequence, the array ready status bit remains in the non-ready status.

In some embodiments, the second command sequence is configured to instruct the flash memory to execute a write operation, and during a timing interval of the flash memory executing operations corresponding to the first command sequence and the second command sequence, the array ready status bit remains in the non-ready status.

In a third aspect, the present disclosure provides a method for executing a cache erase operation in a flash memory, including: receiving address information in response to the receiving of a first command of the first command sequence; executing an erase operation corresponding to the address information and setting an array ready status bit to a non-ready status in response to the receiving of a second command of the first command sequence; and receiving a second command sequence while the array ready status bit is in the non-ready status.

In some embodiments, it indicates that the flash memory is in the non-ready status when the array ready status bit is set to 0, and it indicates that the flash memory is in a ready status when the array ready status bit is set to 1.

In some embodiments, before receiving the first command sequence, the method further includes a step of receiving a set feature command sequence. In response to the receiving of the set feature command sequence, the flash memory is capable of receiving the second command sequence when the array ready status bit is in the non-ready status.

In some embodiments, the second command sequence includes the same commands as the first command sequence, and during a timing interval of the flash memory executing operations corresponding to the first command sequence and the second command sequence, the array ready status bit remains in the non-ready status.

In some embodiments, the second command sequence is configured to instruct the flash memory to execute a read operation, and during a timing interval of the flash memory executing operations corresponding to the first command sequence and the second command sequence, the array ready status bit remains in the non-ready status.

In some embodiments, the second command sequence is configured to instruct the flash memory to execute a write operation, and during a timing interval of the flash memory executing operations corresponding to the first command sequence and the second command sequence, the array ready status bit remains in the non-ready status.

In comparison with the prior art, the present disclosure provides the flash memory controller and the method for executing the cache erase operation, which receives another command sequence or data while executing the erase operation. Therefore, it is prevented from having to wait for the erase operation to complete before performing related operations that use a bus, thereby improving transmission efficiency.

DETAILED DESCRIPTION

Figure 1:
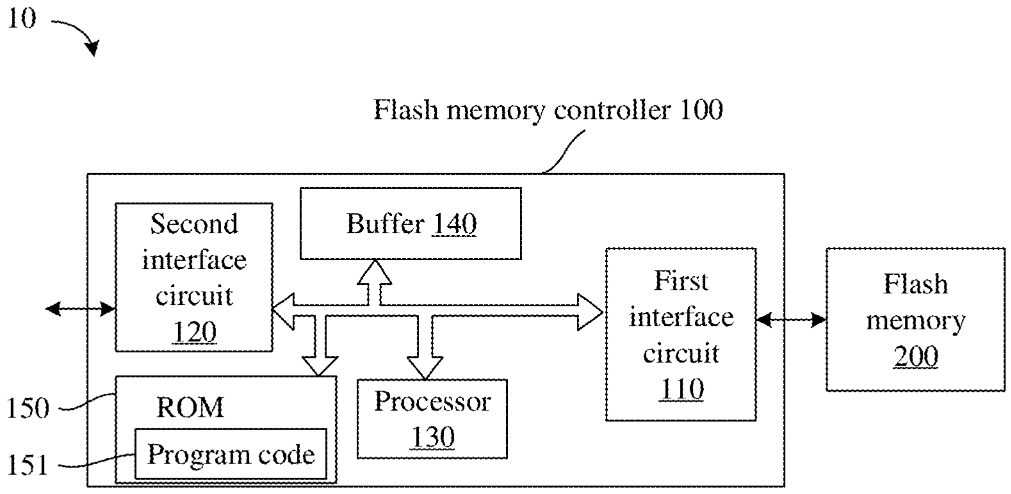
FIG. 1 illustrates a schematic diagram of a memory device of an embodiment of the present disclosure.

Exemplary embodiments of the present disclosure will now be described more fully with reference to the accompanying drawings. The exemplary embodiments may, however, be embodied in many forms and should not be construed as limited to the embodiments set forth herein. Rather, these embodiments are provided so that this disclosure will be thorough and complete, and will fully convey the scope of the disclosure to those skilled in the art. The drawings are merely schematic illustrations of the disclosure, and components in the drawings are not necessarily drawn to scale. The same reference numerals in the drawings denote the same or similar parts, and thus repeated descriptions thereof will be omitted.

Referring to FIG. 1, which illustrates a schematic diagram of a memory device of an embodiment of the present disclosure. The memory device 10 includes a flash memory controller 100 and a flash memory 200. The flash memory controller 100 is configured to control operations of the memory device 10 and access the flash memory 200, and the flash memory 200 is configured to store data. The memory device 10 may include, but is not limited to, solid status drives (SSDs) and various types of embedded memory devices such as embedded memory devices conforming to Peripheral Component Interconnect Express (PCIe) standard.

As shown in FIG. 1, the flash memory controller 100 may include a first interface circuit 110, a second interface circuit 120, a processor 130, a buffer 140, and a read-only memory (ROM) 150. The flash memory controller 100 is coupled to the flash memory 200 via the first interface circuit 110. Furthermore, the flash memory controller 100 can communicate with a host device through the second interface circuit 120. The processor 130 is electrically coupled to the first interface circuit 110, the second interface circuit 120, the buffer 140, and the read-only memory 150. The buffer 140 may be implemented by a random access memory (RAM). For example, the buffer 140 may be a static RAM (SRAM), but the present disclosure is not limited thereto. The read-only memory 150 is configured to store program codes 151.

In some embodiments, the flash memory controller 100 that executes the program codes 151 through the processor 130 can utilize its own internal components to perform many control operations, for example: to control the access of the flash memory 200 by using the first interface circuit 110, to communicate with the host device by using the second interface circuit 120, to perform required buffering processing by using the buffer 140, and so on. For example, the host device can transmit host commands and corresponding logical addresses to the flash memory controller 100. The processor 130 of the flash memory controller 100 receives the host commands and the logical addresses through the second interface circuit 120, and converts the host commands into memory operation commands. The processor 130 further controls the flash memory 200 with the operation commands through the first interface circuit 110 to perform operations such as reading and/or writing (also called programming) of memory cells (such as data pages) at certain physical addresses in the flash memory 200. The physical addresses correspond to the logical addresses. The first interface circuit 110 may include an encoder and a decoder. The encoder is configured to encode data written into the flash memory 200 to generate a corresponding check code, and the decoder is configured to decode data received from the flash memory 200.

In some embodiments, the host device may include a processor and a power supply circuit coupled to each other. The processor can be configured to control operations of the host device. The power supply circuit can be configured to supply power to the processor and the memory device 10, and output one or more driving voltages to the memory device 10. The memory device 10 can be configured to provide storage space to the host device, and obtain one or more driving voltages from the host device as the power supply of the memory device 10. The host device mentioned here may include, but is not limited to, mobile devices, wearable devices, tablet computers, and personal computers such as desktop computers and notebook computers.

In some embodiments, the second interface circuit 120 of the flash memory controller 100 can conform to a specific communication standard, such as Serial Advanced Technology Attachment (Serial ATA or SATA) standard, Peripheral Component Interconnect (PCI) standard, PCIe standard, Universal Flash Storage (UFS) standard, etc., and can communicate according to the specific communication standard, for example, communicate between the host device and the memory device 10. The host device may include a corresponding transmission interface circuit conforming to the specific communication standard for communication between the host device and the memory device 10.

In this embodiment, the flash memory 200 may be a NAND flash. Correspondingly, the first interface circuit 110 of the flash memory controller 100 communicates with the flash memory 200 using a communication protocol compatible with an Open NAND Flash Interface (ONFI). For example, the flash memory controller 100 can convert requests from the host device into commands for the flash memory 200 according to the ONFI protocol, where the commands are selected from a command set defined in an ONFI specification.

Figure 2:
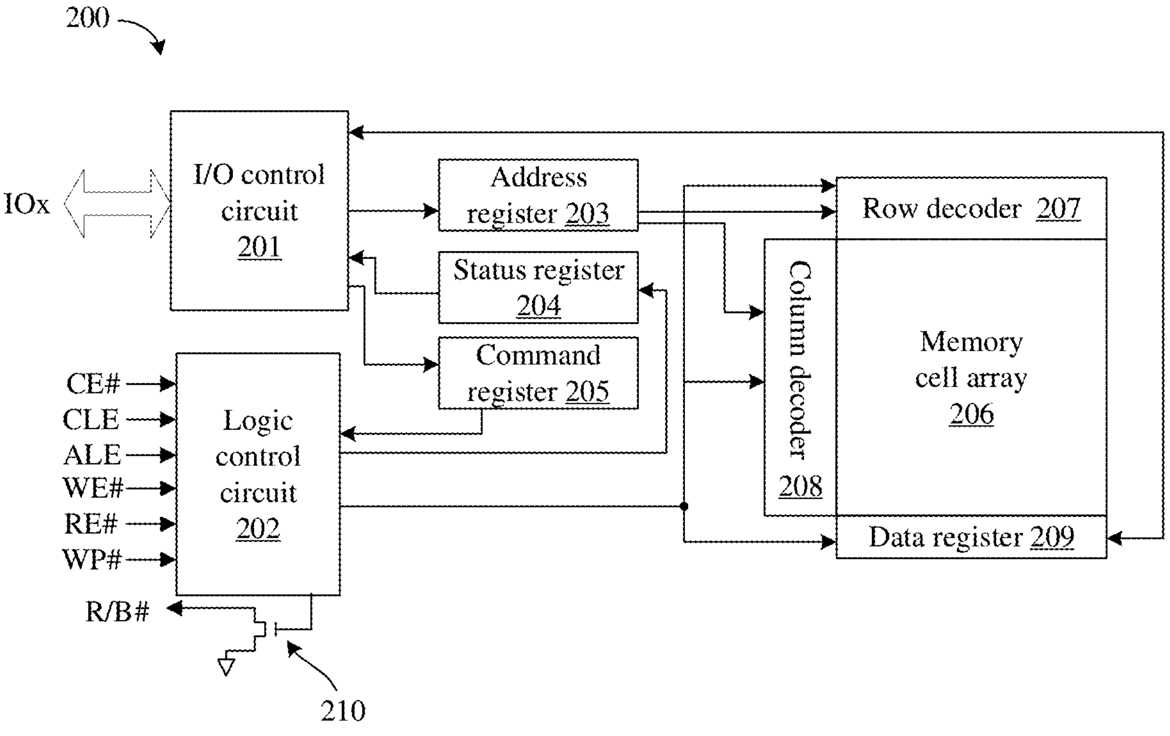
FIG. 2 illustrates a schematic diagram of a flash memory according to an embodiment of the present disclosure.

Referring to FIG. 2, which illustrates a schematic diagram of a flash memory according to an embodiment of the present disclosure. The flash memory 200 includes an input/output (I/O) control circuit 201, a logic control circuit 202, an address register 203, a status register 204, a command register 205, a memory cell array 206, a row decoder 207, a column decoder 208, a data register 209, and a ready/busy (R/B) control circuit 210.

For example, an 8-bit wide input and output signal I/Ox is sent and received between the I/O control circuit 201 and the flash memory controller 100. For example, the I/O control circuit 201 may receive the input/output signal I/Ox including write data from the flash memory controller 100 and transmit it to the data register 209. In addition, the I/O control circuit 201 transmits the read data from the data register 209 to the flash memory controller 100 as the input/output signal I/Ox.

The logic control circuit 202 receives various control signals from the flash memory controller 100 to control the I/O control circuit 201. The control signals include, for example, a chip enable signal CE #, a command latch enable signal CLE, an address latch enable signal ALE, a write enable signal WE #, a read enable signal RE #, and a write protection signal WP #. The logic control circuit 202 controls the overall operation of the flash memory 200. Specifically, the logic control circuit 202 controls the row decoder 207, the column decoder 208, the data register 209, etc. based on the command transmitted from the command register 205, and then performs the write operation, read operation, etc. related to the data.

The address register 203 receives address information from the I/O control circuit 201 and maintains the address information. Furthermore, the address register 203 respectively transmits column address signals and row address signals included in the address information to the row decoder 207, the column decoder 208, and the data register 209. The status register 204 transmits status information to the I/O control circuit 201 according to instructions of the logic control circuit 202. The command register 205 receives commands from the I/O control circuit 201 and maintains the commands. Also, the command register 205 transmits the commands to the logic control circuit 202.

The memory cell array 206 includes a plurality of blocks. The blocks, bit lines, and word lines establish an associated collection of multiple non-volatile memory cells. Each memory cell can store multi-bit data by applying multi-level cell (MLC). Each block includes multiple pages. The page is the smallest unit of programming. In other words, one page is the smallest unit when writing or reading data. The block is the smallest unit of an erase operation. The erase operation must be executed before the flash memory 200 performs the write operation. This is because the write operation can only change the memory cell from "1" to "0", and the erase operation is to set all memory cells to 1.

The logic control circuit 202 may receive a control signal to check the status of the memory cell array 206 and provide a status check result to the status register 204. Referring to Table 1, which illustrates various status values in the status register 204.

TABLE 1

| value | SR[7] | SR[6] | SR[5] | SR[4] | SR[3] | SR[2] | SR[1] | SR[0] |
|---|---|---|---|---|---|---|---|---|
| status register | WP_n | RDY | ARDY | VSP | VSP | VSP | FAILC | FAIL |

FAIL: If the SR[0] bit is set to 1, it indicates that a previous command failed. If the SR[0] bit is cleared to 0, it indicates that the previous command was successful. In one embodiment, the SR[0] bit is only valid for program and erase operations.

FAILC: If the SR[1] bit is set to 1, it indicates that a command before a previous command failed. If the SR[1] bit is cleared to 0, it indicates that the command before the previous command was successful. The SR[1] bit is only valid for cache program operations.

SR[2]-SR[4] VSP: defined and used by vendors.

ARDY: If the SR[5] bit (i.e., an array ready status bit) is set to 1, it indicates that there is no ongoing array operation. If the SR[5] bit is cleared to 0, it indicates that a command is being executed (RDY is cleared to 0), or an array operation is in use. If overlapped multi-plane operations or cache commands are not supported, the SR[5] bit is not used.

RDY: If the SR[6] bit (i.e., a ready status bit) is set to 1, it indicates that the logical unit (LUN) or plane address of another command is ready, and all other bits in the status value are valid. If the SR[6] bit is cleared to 0, it indicates that the last command issued is not yet complete, and the SR[5] bit is invalid and should be ignored by the host device. The SR[6] bit affects the value of signal R/B#. That is, the signal R/B# reflects whether the LUN on the memory cell array 206 is in a busy status. When a cache operation is in progress, the SR[6] bit indicates whether another command can be accepted, and ARDY indicates whether the previous operation is completed.

WP_n: If the SR[7] bit is set to 1, it indicates that the device is not in a write-protected status. If the SR[7] bit is cleared to 0, it indicates that the device is write-protected. Regardless of the value of the SR[6] bit, the SR[7] bit is always valid.

The row decoder 207 and the column decoder 208 select the bit lines and the word lines corresponding to the object memory cells for read operation and write operation. In addition, the row decoder 207 and the column decoder 208 respectively apply required voltages to selected/unselected bit lines and word lines.

The data register 209 outputs the data read from the memory cell array 206 to the flash memory controller 100 through the I/O control circuit 201. In addition, the data register 209 transmits the write data received from the flash memory controller 100 through the I/O control circuit 201 to the memory cell array 206.

The R/B control circuit 210 generates the ready/busy signal R/B # based on the action status of the logic control circuit 202 and transmits the signal to the flash memory controller 100. The ready/busy signal R/B # is a signal that notifies the flash memory controller 100 that the flash memory 200 is in a ready status or a busy status. The ready status is a status in which the command from the flash memory controller 100 can be processed, and the busy status is a status in which the command from the flash memory controller 100 cannot be processed. In addition, the ready/busy signal R/B # is generated by the R/B control circuit 210 controlling the on or off of the transistor connected to its output. For example, the ready/busy signal R/B # is set to a low level (busy status) when the flash memory 200 is accessed, such as reading data from the flash memory 200, and is set to a high level (ready status) when the access is completed.

In an ideal situation (high transmission efficiency), a bus between the flash memory controller 100 and the flash memory 200 should be transmitting commands or data. However, in the prior art, when an erase operation is performed, the bus is in an idle state. In other words, no related operations that use the bus will be performed, such as data or command transmission. This will cause the flash memory controller to stay in a waiting state before the erase operation is completed, unable to fully utilize its computing power and resources. In the present disclosure, by executing a cache erase operation, it is possible to perform related operations that use the bus while executing the erase operation, thereby improving transmission efficiency. The implementations of the present disclosure are specifically described as follows.

Figure 3:
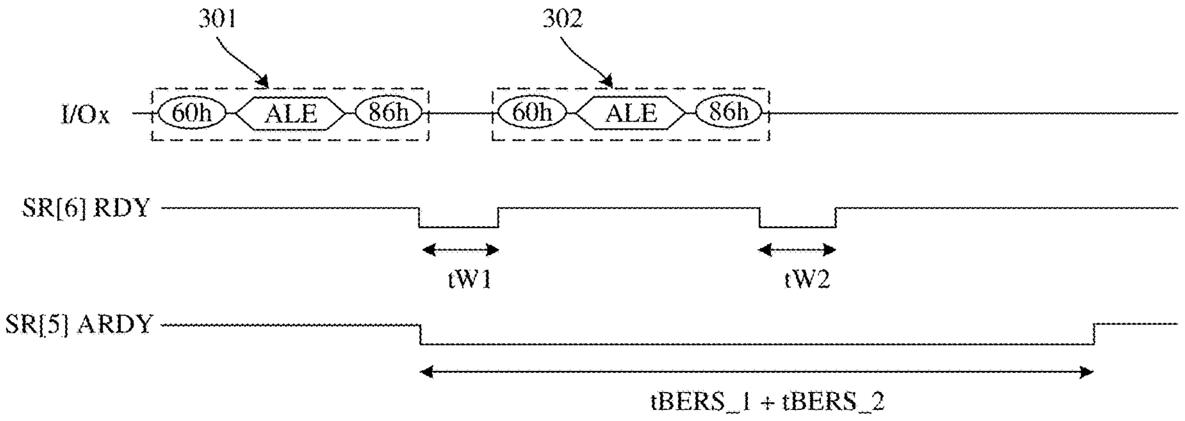
FIG. 3 illustrates a timing diagram of executing a cache erase operation according to a first embodiment of the present disclosure.

Referring to FIG. 3, which illustrates a timing diagram of executing a cache erase operation according to a first embodiment of the present disclosure, in which exemplary waveforms of the ready status bit SR[6] and the array ready status bit SR[5] are shown. It should be understood that a cache erase operation in this embodiment is performed by the above-mentioned memory device 10. Specifically, the first interface circuit 110 of the flash memory controller 100 is coupled to the flash memory 200 to transmit data and commands. Furthermore, the processor 130 of the flash memory controller 100 is coupled to the first interface circuit 110 to access the flash memory 200 through the first interface circuit 110. In this embodiment, the processor 130 controls the first interface circuit 110 to transmit a first command sequence 301 and a second command sequence 302 to the flash memory 200.

As shown in FIG. 3, the first command sequence 301 of the present disclosure is configured to indicate the execution of an erase operation, including commands 60h and 86h. Details of the transmission of the first command sequence 301 are as follows. The processor 130 of the flash memory controller 100 will control the first interface circuit 110 to sequentially transmit an erase command (i.e., a first command) such as 60h, address information ALE (such as block address information of a plane (e.g., an m-th plane)), and a confirmation command (i.e., a second command) such as 86h to the flash memory 200. The block address information may be configured to indicate a block address of a n-th block in the m-th plane (but is not limited to). The input of the first command 60h allows the flash memory 200 to recognize the start of the erase operation, and the first command 60h is configured to instruct the flash memory 200 to receive the address information ALE. That is, when the first command 60h is received, the flash memory 200 can know and confirm that the information following the first command 60h includes the block address information of the block in the m-th plane. In addition, in response to the transmission of the second command 86h, the flash memory 200 starts to perform the erase operation on the block corresponding to the address information ALE. It should be noted that in this embodiment, In this embodiment, the opcode (operation code) of the second command could be any one in the reserved ONFI command set, such as 76h, 82h, 86h, etc. In this example, command 86h is selected as an illustration.

As shown in FIG. 3, in response to the transmission of the second command 86h of the first command sequence 301, the ready status bit SR[6] and the array ready status bit SR[5] of the flash memory 200 are set to 0. As mentioned above, when the ready status bit SR[6] and the array ready status bit SR[5] of the flash memory are set to 0, it means that it is in the non-ready status, and when it is set to 1, it means that it is in the ready status. Then, after a first busy period tW1, the ready status bit SR[6] is set to 1, which means that the flash memory 200 can start receiving another command. Therefore, when the ready status bit SR[6] is set to 1, the processor 130 then transmits the second command sequence 302 to the flash memory 200. That is, when the processor 130 controls the first interface circuit 110 to transmit the second command sequence 302 to the flash memory 200, the ready status bit SR[6] of the flash memory 200 is set to 1 and the array ready status bit SR[5] is set to 0 (that is, it is in the non-ready status). It should be understood that since the flash memory 200 is still executing the erase operation at this time, the second command sequence 302 is transmitted to the corresponding registers, such as the command register 205, the address register 203, etc.

As shown in FIG. 3, in this embodiment, the second command sequence 302 includes the same commands as the first command sequence 301, but the address information ALE of the two are different. For example, the address information ALE of the second command sequence 302 may be configured to indicate the block address of another block in the m-th plane or another plane. That is, when the erase operation corresponding to the first command sequence 301 is completed, the flash memory then executes another erase operation corresponding to the second command sequence 302 to execute the erase operation on another corresponding block.

As shown in FIG. 3, in response to the transmission of second command 86h of the second command sequence 302, the ready status bit SR[6] of the flash memory 200 is set to 0. Then, after a second busy period tW2, the ready status bit SR[6] is set to 1. That is, in some embodiments, the flash memory 200 may start to receive another command at this time, but is not limited thereto.

As shown in FIG. 3, tBERS represents a block erase period. During a timing interval (tBERS_1+tBERS_2) of the flash memory 200 executes operations corresponding to the first command sequence 301 and the second command sequence 302, the array ready status bit SR[5] remains in the non-ready status. When the flash memory 200 completes the operations corresponding to the first command sequence 301 and the second command sequence 302 (through the period tBERS_1+tBERS_2), the array ready status bit SR[5] of the flash memory 200 is set to 1, indicating that there is no ongoing array operation.

It should be understood that in some embodiments, whether the erase operation is successful can be determined by reading the data in the status register of the flash memory 200. If the erase operation is successful, data can be written to the flash memory 200 again. If the erase operation is unsuccessful, the erase command can be issued again to erase the erroneous data in the flash memory 200 until the erase operation is successful. For example, after transmitting the second command sequence 302, the flash memory controller 100 may further transmit a status read command 70h to the flash memory 200. The flash memory 200 responds to the status read command 70h and transmits the status to the flash memory controller 100. At this time, by reading the status value of the SR[0] bit of the status register, it is confirmed whether the erase operation failed or not. When the SR[0] bit is set to 0, it indicates that the erase operation is successfully completed. However, when the SR[0] bit is set to 1, it indicates that the erase operation failed.

In this embodiment, in the first command sequence 301, a conventional erase confirmation command D0h is replaced by the command 86h, so that the flash memory 200 can receive the second command sequence 302 while executing the erase operation. Therefore, it is prevented from having to wait for the erase operation to complete before performing related operations that use the bus, thereby improving transmission efficiency. For example, when two erase operations are executed, this embodiment reduces a transmission time of one command sequence compared to the prior art (because the transmission of the second command sequence 302 and the execution of the erase operation are performed simultaneously (in parallel)).

Figure 4A:
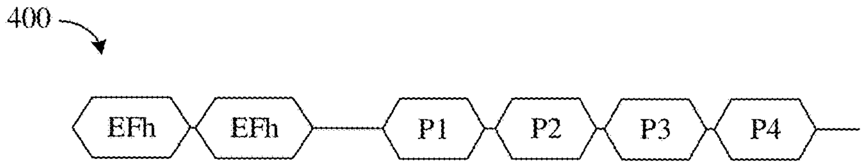
FIG. 4A illustrates a schematic diagram of a set feature command sequence based on a cache erase operation according to an embodiment of the present disclosure.

In the above description, the case where the command 86h is used instead of the conventional erase confirmation command D0h to implement the transmission of the second command sequence 302 and the execution of the erase operation in parallel is taken as an example, but the invention is not limited to this. For example, an operation mode of the memory device 10 can be changed by using a set feature command. Specifically, refer to FIG. 4A, which illustrates a schematic diagram of a set feature command sequence based on a cache erase operation according to an embodiment of the present disclosure. As shown in FIG. 4A, before transmitting a command sequence (such as the first command sequence) instructing the execution of the erase operation, the processor 130 controls the first interface circuit 110 to transmit a set feature command sequence 400 to the flash memory 200. The set feature command is configured to set various parameters of the flash memory 200. If the set feature command is set in the command register, the parameter data sent from the flash memory controller 100 following the set feature command will be set in various registers.

As shown in FIG. 4A, the transmission of the set feature command sequence 400 is as follows. First, the flash memory controller 100 transmits a set feature command (such as EFh) to the flash memory 200. The command EFh is configured to instruct the flash memory 200 to change parameters. Then, the flash memory controller 100 transmits address information EFh to the flash memory 200. The address information EFh specifies the address corresponding to the parameter to be changed. Then, the flash memory controller 100 outputs setting data P1-P4 to the flash memory 200 in multiple cycles. The setting data P1 to P4 output here correspond to the data of the parameter to be changed. When the flash memory 200 receives the set feature command sequence 400, it starts setting features and changes the operation mode of the flash memory 200. In this embodiment, the flash memory controller 100 can use the set feature command to set the cache erase operation of the flash memory 200. Specifically, the set feature command sequence is configured so that the flash memory controller 100 can transmit the second command sequence to the flash memory 200 when the array ready status bit is in the non-ready status. In other words, the set feature command sequence is configured so that the flash memory 200 receives the second command sequence while executing the erase operation.

It should be noted that in this embodiment, the first command sequence transmitted after the set feature command sequence 400 is <60h-ALE-D0h>, that is, the first command is 60h and the second command is D0h. In some electronic products, it is restricted that the commands to execute the erase operation must contain D0h. At this time, by transmitting and enabling the above set feature command sequence 400, it is realized that the flash memory 200 can receive the second command sequence while executing the erase operation without changing the conventional erase operation command sequence (i.e., the first command sequence <60h-ALE-D0h>).

Figure 4B:
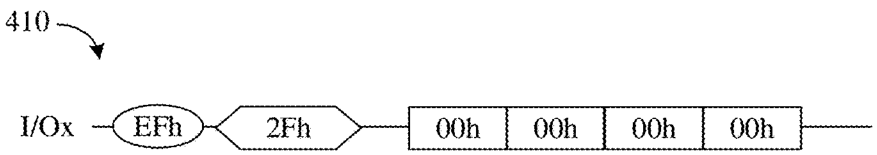
FIG. 4B illustrates a schematic diagram of a set feature command sequence that enables a cache erase operation according to an embodiment of the present disclosure.
Figure 4C:
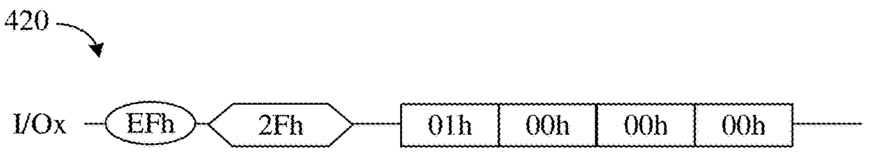
FIG. 4C illustrates a schematic diagram of a set feature command sequence that disables a cache erase operation according to an embodiment of the present disclosure.

Referring to FIG. 4B and FIG. 4C, where FIG. 4B illustrates a schematic diagram of a set feature command sequence that enables a cache erase operation according to an embodiment of the present disclosure, and FIG. 4C illustrates a schematic diagram of a set feature command sequence that disables a cache erase operation according to an embodiment of the present disclosure. When the flash memory controller 100 or the flash memory 200 is powered (or turned on), the processor 130 of the flash memory controller 100 can control the first interface circuit 110 to transmit a set feature command sequence 410 or 420 to the flash memory 200 to enable or disable the above cache erase operation (receiving the second command sequence while executing the erase operation) of the flash memory 200. As shown in FIG. 4B, in the set feature command sequence 410 indicating enabling the cache erase operation, the address information is, for example, 2Fh, and the setting data P1 is, for example, 00h. Also, as shown in FIG. 4C, in the set feature command sequence 420 which indicates to disable the cache erase operation, the address information is, for example, 2Fh, and the setting data P1 is, for example, 01h. It should be understood that the setting data P1 is configured to indicate whether to enable or disable the above cache erase operation. When the setting data P1 is set to a logical bit such as 0, the above cache erase operation may be enabled. When the setting data P1 is set to a logical bit such as 1, the above cache erase operation will be disabled. In this case, when executing the conventional erase operation with the command sequence <60h-ALE-D0h>, it must wait for the erase operation to complete before performing related operations that use the bus.

Figure 5:
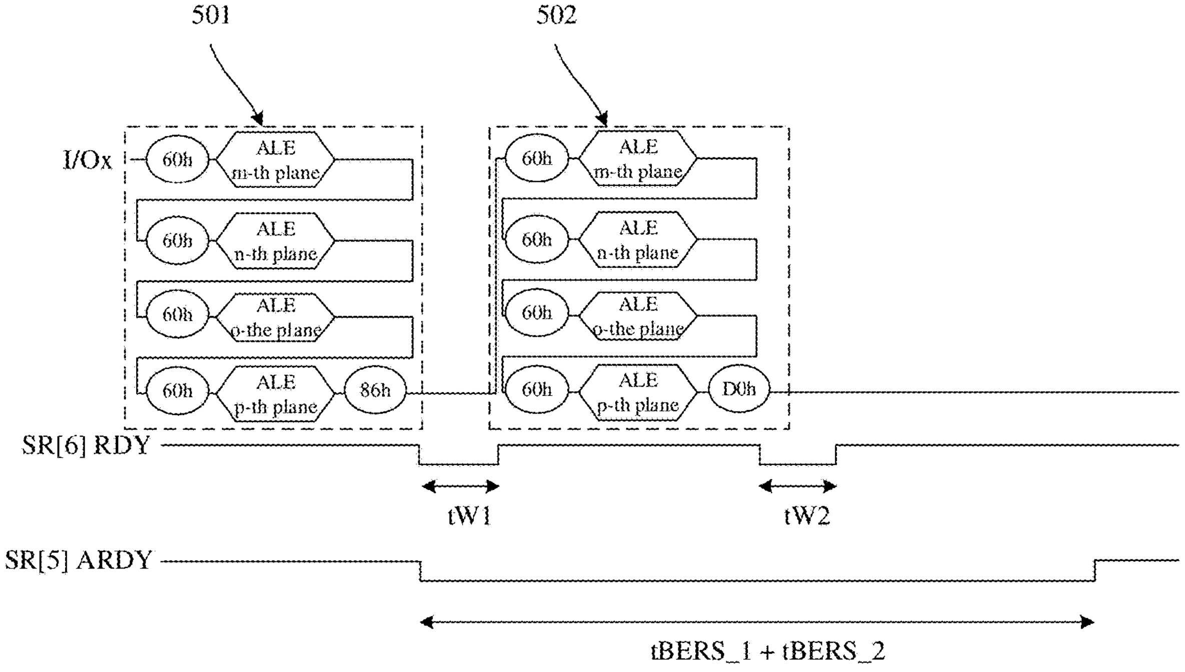
FIG. 5 illustrates a timing diagram of executing a cache erase operation according to a second embodiment of the present disclosure.

Referring to FIG. 5, which illustrates a timing diagram of executing a cache erase operation according to a second embodiment of the present disclosure, in which exemplary waveforms of a ready status bit SR[6] and an array ready status bit SR[5] are shown. In this embodiment, the processor 130 controls the first interface circuit 110 to transmit a first command sequence 501 and a second command sequence 502 to the flash memory 200.

As shown in FIG. 5, the first command sequence 501 is configured to indicate a multi-plane erase operation, including a plurality of first command 60h and a second command 86h. The details of the transmission of the first command sequence 501 are as follows. The processor 130 of the flash memory controller 100 controls the first interface circuit 110 to sequentially transmit the plurality of first commands 60h. Moreover, a corresponding address information ALE is transmitted after each first command 60h. The address information ALE is configured to indicate a block address of a block in a corresponding plane, such as an m-th plane, a n-th plane, an o-th plane, and a p-th plane. After transmitting the address information ALE of the last plane, the flash memory controller 100 transmits a confirmation command (i.e., the second command) such as 86h to the flash memory 200. In response to the transmission of the second command 86h, the flash memory 200 starts to perform a multi-plane erase operation on the blocks in the planes corresponding to the address information ALE. In this embodiment, the opcode (operation code) of the second command could be any one in the reserved ONFI command set, such as 76h, 82h, 86h, etc. In this example, command 86h is selected as an illustration.

As shown in FIG. 5, in response to the transmission of the second command 86h of the first command sequence 501, the ready status bit SR[6] and the array ready status bit SR[5] of the flash memory 200 are set to 0. Then, after a first busy period tW1, the ready status bit SR[6] is set to 1, which means that the flash memory 200 can start receiving another command. Therefore, when the ready status bit SR[6] is set to 1, the processor 130 then transmits the second command sequence 502 to the flash memory 200. That is, when the processor 130 controls the first interface circuit 110 to transmit the second command sequence 502 to the flash memory 200, the ready status bit SR[6] of the flash memory 200 is set to 1 and the array ready status bit SR[5] is set to 0. It should be understood that since the flash memory 200 is still executing the erase operation at this time, the second command sequence 502 is transmitted to the corresponding registers, such as the command register 205, the address register 203, etc.

As shown in FIG. 5, in this embodiment, the second command sequence 502 is also configured to instruct the execution of the multi-plane erase operation. That is, when the multi-plane erase operation corresponding to the first command sequence 501 is completed, the flash memory immediately executes another plane erase operation corresponding to the second command sequence 502.

In this embodiment, in the first command sequence 501, the conventional erase confirmation command D0h is replaced by the command 86h, so that the flash memory 200 can receive the second command sequence 502 while executing the erase operation. Therefore, it is prevented from having to wait for the erase operation to complete before performing related operations that use the bus, thereby improving transmission efficiency. It should be understood that based on the cache erase operation of the second embodiment, the operation mode of the memory device 10 can be changed through a combination of the set feature command and the existing multi-plane erase command sequence. Thus, it is possible to perform related operations that use the bus while performing the multi-plane erase operation. On the other hand, the remaining features of the second embodiment are the same as those of the first embodiment and will not be described again.

Figure 6:
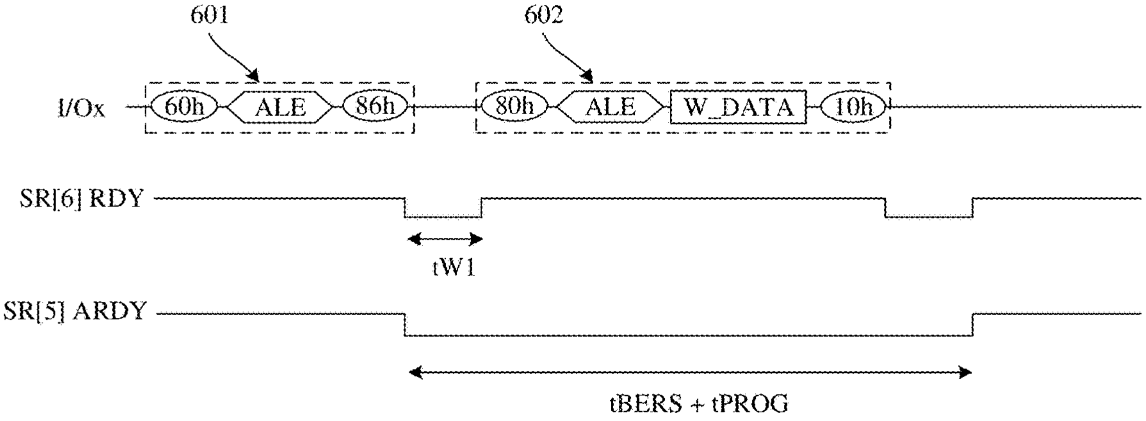
FIG. 6 illustrates a timing diagram of executing a cache erase operation according to a third embodiment of the present disclosure.

Referring to FIG. 6, which illustrates a timing diagram of executing a cache erase operation according to a third embodiment of the present disclosure, in which exemplary waveforms of a ready status bit SR[6] and an array ready status bit SR[5] are shown. In this embodiment, the processor 130 controls the first interface circuit 110 to transmit a first command sequence 601 and a second command sequence 602 to the flash memory 200.

As shown in FIG. 6, the first command sequence 601 is configured to instruct the execution of the erase operation, including a first command 60h and a second command 86h. It should be understood that the first command sequence 601 of the third embodiment is the same as the first command sequence 301 of the first embodiment, and will not be described again.

As shown in FIG. 6, in response to the transmission of the second command 86h of the first command sequence 601, the ready status bit SR[6] and the array ready status bit SR[5] of the flash memory 200 are set to 0. Then, after a first busy period tW1, the ready status bit SR[6] is set to 1, which means that the flash memory 200 can start receiving another command. Therefore, when the ready status bit SR[6] is set to 1, the processor 130 then transmits the second command sequence 602 to the flash memory 200. That is, when the processor 130 controls the first interface circuit 110 to transmit the second command sequence 602 to the flash memory 200, the ready status bit SR[6] of the flash memory 200 is set to 1 and the array ready status bit SR[5] is set to 0. It should be understood that since the flash memory 200 is still executing the erase operation at this time, the second command sequence 602 is transmitted to the corresponding registers, such as the command register 205, the address register 203, etc.

As shown in FIG. 6, in this embodiment, the second command sequence 602 is configured to instruct the flash memory 200 to perform a write operation. The second command sequence 602 includes commands 80h and 10h. Specifically, the flash memory controller 100 transmits the command 80h to the flash memory 200. The command 80h is a command that instructs the flash memory 200 to receive address information ALE, that is, an address receiving command. Then, the processor 130 of the flash memory controller 100 also controls the first interface circuit 110 to transmit the address information ALE to the flash memory 200, and also sequentially transmits stored data W_DATA to be written to the data register 209 of the flash memory 200. Finally, the flash memory controller 100 transmits the command 10h to the flash memory 200. The command 10h is configured to instruct the flash memory 200 to perform the write operation. When the erase operation corresponding to the first command sequence 601 is completed, the flash memory 200 then executes the write operation corresponding to the second command sequence 602. During the write operation, in units of pages, the stored data W_DATA in the data register 209 is written to pages corresponding to the logical address in the flash memory 200. In FIG. 6, tPROG indicates a period during which the write operation is executed. It should be noted that during a timing interval (tBERS+tPROG) of the flash memory 200 executing operations corresponding to the first command sequence 601 and the second command sequence 602, the array ready status bit SR[5] remains in the non-ready status.

In this embodiment, in the first command sequence 601, the conventional erase confirmation command D0h is replaced by the command 86h, so that the flash memory 200 can receive the second command sequence 602 while executing the erase operation. Therefore, it is prevented from having to wait for the erase operation to complete before performing related operations that use the bus, thereby improving transmission efficiency. For example, when the erase operation and the write operation are executed continuously, this embodiment reduces a transmission time of the command sequence and the written data compared to the existing technology (because the transmission of the second command sequence 602 and the stored data W_DATA is performed simultaneously (in parallel) with the execution of the erase operation). It should be understood that based on the cache erase operation of the third embodiment, the operation mode of the memory device 10 can be changed by combining the set feature command with the existing erase command sequence, so that the erase operation can be executed simultaneously with bus-related operations. On the other hand, the remaining features of the third embodiment are substantially the same as those of the first embodiment and will not be described again here.

Figure 7:
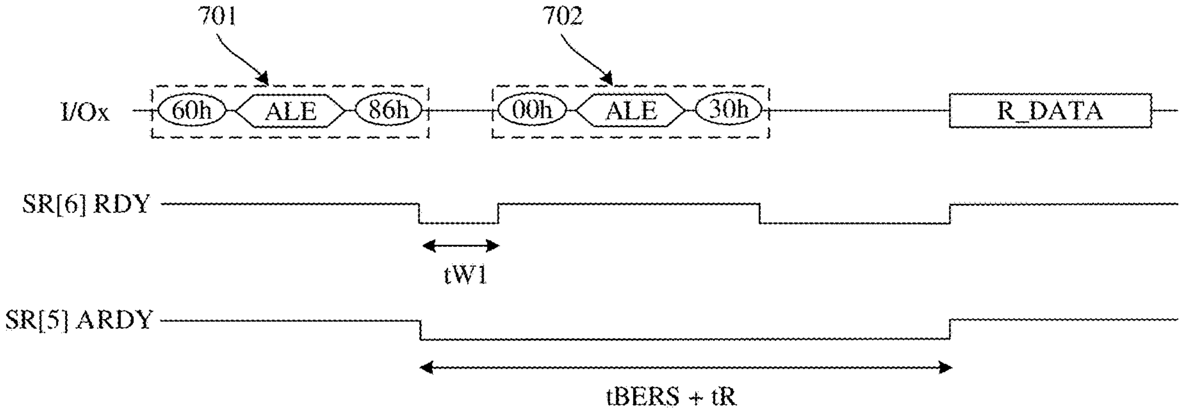
FIG. 7 illustrates a timing diagram of executing a cache erase operation according to a fourth embodiment of the present disclosure.

Referring to FIG. 7, which illustrates a timing diagram of executing a cache erase operation according to a fourth embodiment of the present disclosure, in which exemplary waveforms of a ready status bit SR[6] and an array ready status bit SR[5] are shown. In this embodiment, the processor 130 controls the first interface circuit 110 to transmit a first command sequence 701 and a second command sequence 702 to the flash memory 200.

As shown in FIG. 7, the first command sequence 701 is configured to instruct the execution of the erase operation, including a first command 60h and a second command 86h. It should be understood that the first command sequence 701 of the fourth embodiment is the same as the first command sequence 301 of the first embodiment, and will not be described again.

As shown in FIG. 7, in response to the transmission of the second command 86h of the first command sequence 701, the ready status bit SR[6] and the array ready status bit SR[5] of the flash memory 200 are set to 0. Then, after a first busy period tW1, the ready status bit SR[6] is set to 1, which means that the flash memory 200 can start receiving another command. Therefore, when the ready status bit SR[6] is set to 1, the processor 130 then transmits the second command sequence 702 to the flash memory 200. That is, when the processor 130 controls the first interface circuit 110 to transmit the second command sequence 702 to the flash memory 200, the ready status bit SR[6] of the flash memory 200 is set to 1 and the array ready status bit SR[5] is set to 0. It should be understood that since the flash memory 200 is still executing the erase operation at this time, the second command sequence 702 is transmitted to the corresponding registers, such as the command register 205, the address register 203, etc.

As shown in FIG. 7, in this embodiment, the second command sequence 702 is configured to instruct the flash memory 200 to perform a read operation. The second command sequence 702 includes commands 00h and 30h. Specifically, the flash memory controller 100 transmits the command 00h to the flash memory 200. The command 00h is a command that instructs the flash memory 200 to receive address information ALE, that is, an address receiving command. The processor 130 of the flash memory controller 100 also controls the first interface circuit 110 to transmit the address information ALE to the flash memory 200, and then transmits the command 30h to the flash memory 200. The command 30h is configured to instruct the flash memory 200 to perform the read operation. When the erase operation corresponding to the first command sequence 701 is completed, the flash memory 200 then executes the read operation corresponding to the second command sequence 702. During the read operation, the processor 130 then controls the first interface circuit 110 to receive stored data R_DATA read from the flash memory 200. Specifically, the stored data R_DATA in the flash memory 200 is transmitted to the I/O control circuit 201 through the data register 209, and then transmitted to the flash memory controller 100. In FIG. 7, tR indicates a period during which the read operation is executed. It should be noted that during a timing interval (tBERS+tR) of the flash memory 200 executing operations corresponding to the first command sequence 701 and the second command sequence 702, the array ready status bit SR[5] remains in the non-ready status.

In this embodiment, in the first command sequence 701, the conventional erase confirmation command D0h is replaced by the command 86h, so that the flash memory 200 can receive the second command sequence 702 while executing the erase operation. Therefore, it is prevented from having to wait for the erase operation to complete before performing related operations that use the bus, thereby improving transmission efficiency. For example, when the erase operation and the read operation are executed continuously, this embodiment reduces a transmission time of the command sequence compared to the prior art (because the transmission of the second command sequence 702 is performed simultaneously (in parallel) with the execution of the erase operation). It should be understood that based on the cache erase operation of the fourth embodiment, the operation mode of the memory device 10 can be changed by combining the set feature command with the existing erase command sequence, so that related operations that use the bus can be performed while executing the erase operation. On the other hand, the remaining features of the fourth embodiment are substantially the same as those of the first embodiment and will not be described again here.

The present disclosure also provides a method for executing a cache erase operation in a flash memory controller. The flash memory controller is coupled to a flash memory to transfer data and commands. The flash memory controller and the flash memory are as mentioned above and will not be described in detail here. Specifically, the processor of the flash memory controller is typically configured to control the overall operation of the memory device. The processor executes program codes and then performs all or part of the steps in the cache erase operation as described in the first to fourth embodiments.

Figure 8:
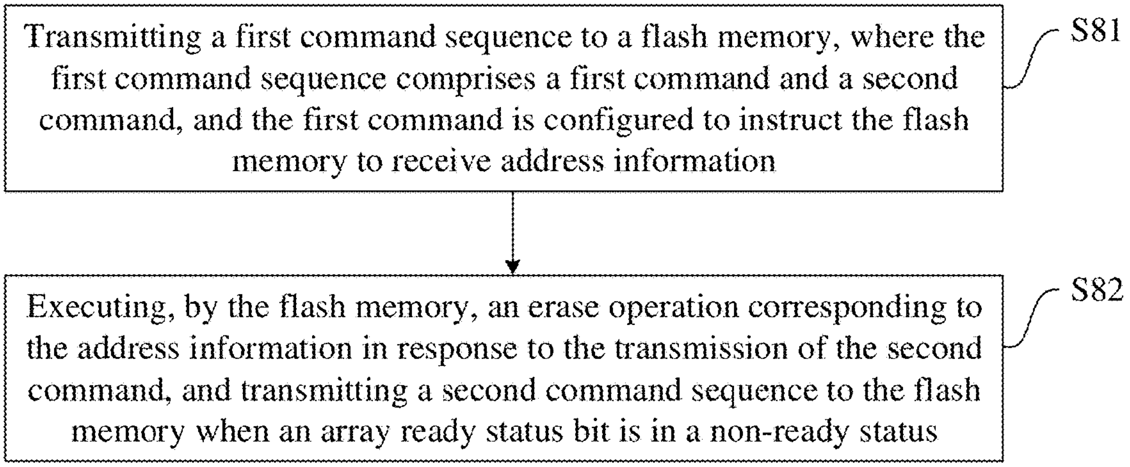
FIG. 8 illustrates a flowchart of a method for executing a cache erase operation in a flash memory controller according to an embodiment of the present disclosure.

Referring to FIG. 8, which illustrates a flowchart of a method for executing a cache erase operation in a flash memory controller according to an embodiment of the present disclosure. The cache erase operation includes at least step S81 to step S82. In the step S81, a first command sequence is transmitted to a flash memory, where the first command sequence includes a first command and a second command. The first command is configured to instruct the flash memory to receive address information. In the step S82, in response to the transmission of the second command, the flash memory performs an erase operation corresponding to the address information, and when an array ready status bit is in a non-ready status, the second command sequence is transmitted to the flash memory.

In some embodiments, the flash memory is in the non-ready status when the array ready status bit of the flash memory is set to 0, and the flash memory is in a ready status when the array ready status bit of the flash memory is set to 1.

In some embodiments, before transmitting the first command sequence, the method further includes a step of transmitting a set feature command sequence to the flash memory. In response to the transmission of the set feature command sequence, the flash memory controller is capable of transmitting the second command sequence to the flash memory when the array ready status bit is in the non-ready status.

In some embodiments, the second command sequence includes the same commands as the first command sequence, and during a timing interval of the flash memory executing operations corresponding to the first command sequence and the second command sequence, the array ready status bit remains in the non-ready status.

In some embodiments, the second command sequence is configured to instruct the flash memory to execute a read operation, and during a timing interval of the flash memory executing operations corresponding to the first command sequence and the second command sequence, the array ready status bit remains in the non-ready status.

In some embodiments, the second command sequence is configured to instruct the flash memory to execute a write operation, and during a timing interval of the flash memory executing operations corresponding to the first command sequence and the second command sequence, the array ready status bit remains in the non-ready status.

The present disclosure also provides a method for executing a cache erase operation in a flash memory. A flash memory controller is coupled to the flash memory to transfer data and commands. The flash memory controller and the flash memory are as mentioned above and will not be described in detail here. Specifically, the flash memory performs all or part of the steps in the cache erase operation as described in the above-mentioned first to fourth embodiments.

Figure 9:
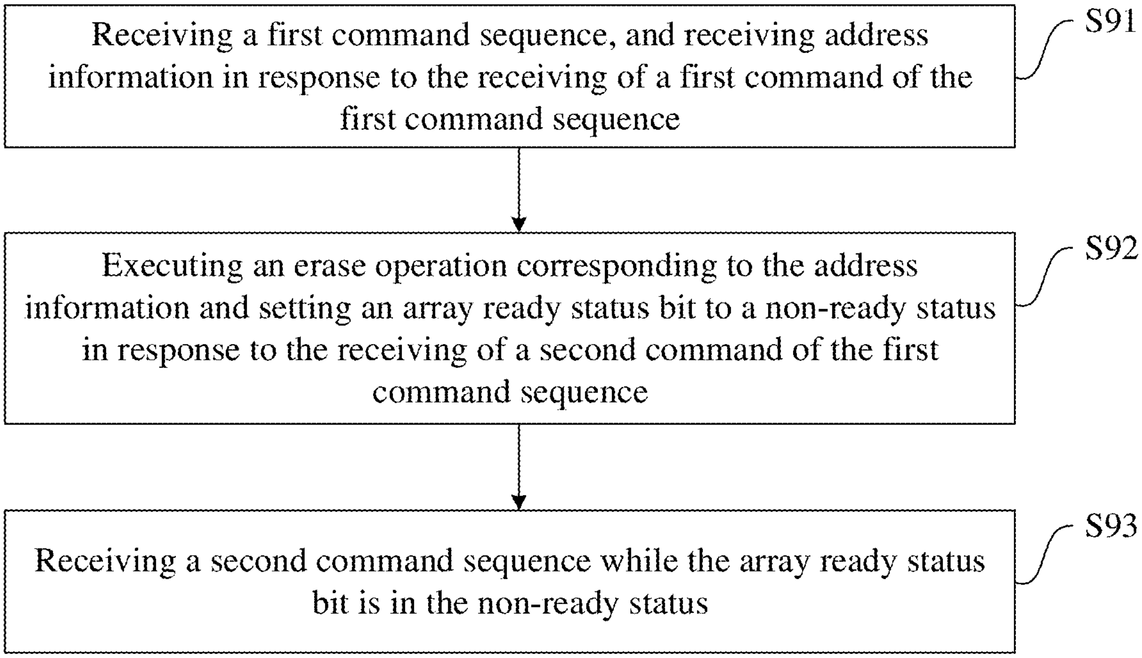
FIG. 9 illustrates a flowchart of a method for executing a cache erase operation in a flash memory according to an embodiment of the present disclosure.

Referring to FIG. 9, which illustrates a flowchart of a method for executing a cache erase operation in a flash memory according to an embodiment of the present disclosure. The cache erase operation includes at least step S91 to step S93. In the step S91, a first command sequence is received, and corresponding address information is received in response to the receiving of a first command of the first command sequence. In the step S92, in response to the receiving of a second command of the first command sequence, an erase operation corresponding to the address information is performed and an array ready status bit is set to a non-ready status. In the step S93, the second command sequence is received while the array ready status bit is in the non-ready status.

In some embodiments, the flash memory is in the non-ready status when the array ready status bit is set to 0, and the flash memory is in a ready status when the array ready status bit is set to 1.

In some embodiments, before receiving the first command sequence, the method further includes a step of receiving a set feature command sequence. In response to the receiving of the set feature command sequence, the flash memory is capable of receiving the second command sequence when the array ready status bit is in the non-ready status.

In some embodiments, the second command sequence includes the same commands as the first command sequence, and during a timing interval of the flash memory executing operations corresponding to the first command sequence and the second command sequence, the array ready status bit remains in the non-ready status.

In some embodiments, the second command sequence is configured to instruct the flash memory to execute a read operation, and during a timing interval of the flash memory executing operations corresponding to the first command sequence and the second command sequence, the array ready status bit remains in the non-ready status.

In some embodiments, the second command sequence is configured to instruct the flash memory to execute a write operation, and during a timing interval of the flash memory executing operations corresponding to the first command sequence and the second command sequence, the array ready status bit remains in the non-ready status.

The above are only specific implementations of the present disclosure, but the protection scope of the present disclosure is not limited thereto. Any changes or replacements that can be easily devised by those skilled in the art within the technical scope of the present disclosure should all fall within the protection scope of the present disclosure. Therefore, the protection scope of the present disclosure should be defined by the protection scope of appending claims.

What is claimed is:

1. A flash memory controller for controlling a flash memory, wherein the flash memory controller comprises:

a first interface circuit coupled to the flash memory to transmit data and commands; and a processor coupled to the first interface circuit to access the flash memory through the first interface circuit, wherein the processor controls the first interface circuit to transmit a first command sequence and a second command sequence to the flash memory; and wherein the first command sequence comprises a first command and a second command, the first command is configured to instruct the flash memory to receive address information, and in response to the transmission of the second command, the flash memory executes an erase operation corresponding to the address information, and when an array ready status bit is in a non-ready status and a ready status bit of the flash memory is in a ready status, the second command sequence is transmitted to the flash memory while the flash memory is executing an erase operation corresponding to the first command sequence, wherein the second command sequence comprises at least one of an erase command, a write command, or a read command.

2. The flash memory controller of claim 1, wherein the flash memory is in the non-ready status when the array ready status bit of the flash memory is set to 0, and the flash memory is in a ready status when the array ready status bit of the flash memory is set to 1.

3. The flash memory controller of claim 1, wherein in response to the transmission of the second command, a ready status bit of the flash memory and the array ready status bit are set to 0, and after a first busy period, the ready status bit is set to 1 and the array ready status bit is set to 0.

4. The flash memory controller according to claim 1, wherein the processor controls the first interface circuit to transmit a set feature command sequence to the flash memory before transmitting the first command sequence, the set feature command sequence is configured to enable the flash memory controller to transmit the second command sequence to the flash memory when the array ready status bit is in the non-ready status.

5. The flash memory controller of claim 1, wherein the second command sequence comprises the same commands as the first command sequence, and during a timing interval of the flash memory executing operations corresponding to the first command sequence and the second command sequence, the array ready status bit remains in the non-ready status.

6. The flash memory controller of claim 1, wherein the second command sequence is configured to instruct the flash memory to execute a read operation, and during a timing interval of the flash memory executing operations corresponding to the first command sequence and the second command sequence, the array ready status bit remains in the non-ready status.

7. The flash memory controller of claim 1, wherein the second command sequence is configured to instruct the flash memory to execute a write operation, and during a timing interval of the flash memory executing operations corresponding to the first command sequence and the second command sequence, the array ready status bit remains in the non-ready status.

8. A method for executing a cache erase operation in a flash memory controller, wherein the flash memory controller is coupled to a flash memory to transmit data and commands, the method comprises:

transmitting a first command sequence to the flash memory, wherein the first command sequence comprises a first command and a second command, and the first command is configured to instruct the flash memory to receive address information; and executing, by the flash memory, an erase operation corresponding to the address information in response to the transmission of the second command, and transmitting a second command sequence to the flash memory when an array ready status bit is in a non-ready status and a ready status bit of the flash memory is in a ready status, while the flash memory is executing the erase operation, wherein the second command sequence comprises at least one of a read command, a write command, or an erase command.

9. The method for executing the cache erase operation in the flash memory controller of claim 8, wherein the flash memory is in the non-ready status when the array ready status bit of the flash memory is set to 0, and the flash memory is in a ready status when the array ready status bit of the flash memory is set to 1.

10. The method for executing the cache erase operation in the flash memory controller of claim 8, wherein before transmitting the first command sequence, the method further comprises: transmitting a set feature command sequence to the flash memory, wherein in response to the transmission of the set feature command sequence, the flash memory controller is capable of transmitting the second command sequence to the flash memory when the array ready status bit is in the non-ready status.

11. The method for executing the cache erase operation in the flash memory controller of claim 8, wherein the second command sequence comprises the same commands as the first command sequence, and during a timing interval of the flash memory executing operations corresponding to the first command sequence and the second command sequence, the array ready status bit remains in the non-ready status.

12. The method for executing the cache erase operation in the flash memory controller of claim 8, wherein the second command sequence is configured to instruct the flash memory to execute a read operation, and during a timing interval of the flash memory executing operations corresponding to the first command sequence and the second command sequence, the array ready status bit remains in the non-ready status.

13. The method for executing the cache erase operation in the flash memory controller of claim 8, wherein the second command sequence is configured to instruct the flash memory to execute a write operation, and during a timing interval of the flash memory executing operations corresponding to the first command sequence and the second command sequence, the array ready status bit remains in the non-ready status.

14. A method for executing a cache erase operation in a flash memory, comprising:

receiving a first command sequence, and receiving address information in response to the receiving of a first command of the first command sequence;

executing an erase operation corresponding to the address information and setting an array ready status bit to a non-ready status in response to the receiving of a second command of the first command sequence; and receiving a second command sequence while the array ready status bit is in the non-ready status and a ready status bit of the flash memory is in a ready status, wherein the flash memory is executing the erase operation corresponding to the first command sequence upon receiving the second command sequence, and wherein the second command sequence comprises at least one of a read command, a write command, or an erase command.

15. The method for executing the cache erase operation in the flash memory of claim 14, wherein the flash memory is in the non-ready status when the array ready status bit is set to 0, and the flash memory is in a ready status when the array ready status bit is set to 1.

16. The method for executing the cache erase operation in the flash memory of claim 14, wherein before receiving the first command sequence, the method further comprises: receiving a set feature command sequence, wherein in response to the receiving of the set feature command sequence, the flash memory is capable of receiving the second command sequence when the array ready status bit is in the non-ready status.

17. The method for executing the cache erase operation in the flash memory of claim 14, wherein the second command sequence comprises the same commands as the first command sequence, and during a timing interval of the flash memory executing operations corresponding to the first command sequence and the second command sequence, the array ready status bit remains in the non-ready status.

18. The method for executing the cache erase operation in the flash memory of claim 14, wherein the second command sequence is configured to instruct the flash memory to execute a read operation, and during a timing interval of the flash memory executing operations corresponding to the first command sequence and the second command sequence, the array ready status bit remains in the non-ready status.

19. The method for executing the cache erase operation in the flash memory of claim 14, wherein the second command sequence is configured to instruct the flash memory to execute a write operation, and during a timing interval of the flash memory executing operations corresponding to the first command sequence and the second command sequence, the array ready status bit remains in the non-ready status.

* * * * *